(12) United States Patent
De Sousa

(10) Patent No.: US 10,193,463 B2
(45) Date of Patent: Jan. 29, 2019

(54) INSULATED DC/DC CONVERTER

(71) Applicant: VALEO SYSTEMES DE CONTROLE MOTEUR, Cergy Pontoise (FR)

(72) Inventor: Luis De Sousa, Eragny sur Oise (FR)

(73) Assignee: VALEO SYSTEMES DE CONTROLE MOTEUR, Cergy Pontoise (FR)

( * ) Notice: Subject to any disclaimer, the term of this patent is extended or adjusted under 35 U.S.C. 154(b) by 0 days.

(21) Appl. No.: 15/768,517

(22) PCT Filed: Oct. 13, 2016

(86) PCT No.: PCT/EP2016/074641
§ 371 (c)(1),
(2) Date: Apr. 13, 2018

(87) PCT Pub. No.: WO2017/064220
PCT Pub. Date: Apr. 20, 2017

(65) Prior Publication Data
US 2018/0309376 A1    Oct. 25, 2018

(30) Foreign Application Priority Data

Oct. 16, 2015 (FR) ..................... 15 59844

(51) Int. Cl.
*H02M 7/155* (2006.01)
*H02M 3/335* (2006.01)
(Continued)

(52) U.S. Cl.
CPC ....... *H02M 3/33584* (2013.01); *H02M 3/005* (2013.01); *H02M 3/33507* (2013.01); *H02M 2001/0058* (2013.01)

(58) Field of Classification Search
CPC ......... H02M 3/33584; H02M 3/33507; H02M 7/155
(Continued)

(56) References Cited

U.S. PATENT DOCUMENTS 4,257,087 A    3/1981 Cuk
5,754,413 A    5/1998 Fraidlin et al.
(Continued)

OTHER PUBLICATIONS

Claudio Manoel C Duarte et al: "A Family of ZVS-PWM Active-Clamping DC-to-DC Converters: Synthesis, Analysis, Design, and Experimentation", IEEE Transactions on Circuits and Systems Part I: Regular Papers, IEEE Service Center New York, NY, US, vol. 44, No. 8, Aug. 1, 1997 (Aug. 1, 1997), XP011011595, ISSN: 1057-7122. The whole document.

(Continued)

*Primary Examiner* — Adolf Berhane
*Assistant Examiner* — Nusrat Quddus
(74) *Attorney, Agent, or Firm* — Joseph G. Chu; JCIP

(57) ABSTRACT

The invention concerns an isolated DC/DC converter comprising an isolated circuit having:
a first arm having a first switch, in series with a second switch;
a magnetic component having two primary circuits and a secondary circuit that are separated by at least one electrical isolation barrier, said magnetic component being configured so as, during the conversion of an input voltage of the isolated DC/DC converter into an output voltage, to operate as a transformer from the primary circuits to the secondary circuit and as an impedance that stores energy in the primary circuits,
and in which:
the first arm comprises a first capacitance in series with the two switches and situated between the two switches, (Continued)

one of said primary circuits, called the second primary circuit, is connected between a first end terminal of the first arm and the connection point, called the second connection point, between the second switch of the first arm and the first capacitance, the first end terminal of the first arm corresponding to the terminal of the first switch that is not connected to the first capacitance; and the other primary circuit, called the first primary circuit, is connected between a second end terminal of the first arm and the connection point, called the first connection point, between the first switch and the first capacitance, the second end terminal of the first arm corresponding to the terminal of the second switch that is not connected to the first capacitance.

14 Claims, 7 Drawing Sheets

(51) Int. Cl.
*H02M 3/00* (2006.01)
*H02M 1/00* (2006.01)

(58) Field of Classification Search
USPC .... 363/15–17, 40, 41, 44–53, 123, 125–127
See application file for complete search history.

(56) References Cited

U.S. PATENT DOCUMENTS

| 5,946,208 | A   | * | 8/1999 | Yamamoto | A61B 6/488 363/132 |
| 6,711,533 | B1  | * | 3/2004 | Aymard | H02M 3/3376 363/17 |
| 2005/0002212 | A1 | * | 1/2005 | Okuma | H02J 9/062 363/50 |
| 2009/0059622 | A1 | * | 3/2009 | Shimada | H02M 1/32 363/17 |
| 2012/0127765 | A1 | * | 5/2012 | Maruyama | H02J 50/12 363/126 |
| 2014/0063860 | A1 | * | 3/2014 | Suzuki | H02M 1/36 363/17 |
| 2015/0001958 | A1 | * | 1/2015 | Abe | H02J 5/005 307/104 |
| 2015/0236611 | A1 | * | 8/2015 | Nakazawa | H02M 7/06 363/123 |

OTHER PUBLICATIONS

Preliminary Report of Application No. FR 1559844 dated Jun. 6, 2016.
International Search Report and Written Opinion of Application No. PCT/EP2016/074641.

* cited by examiner

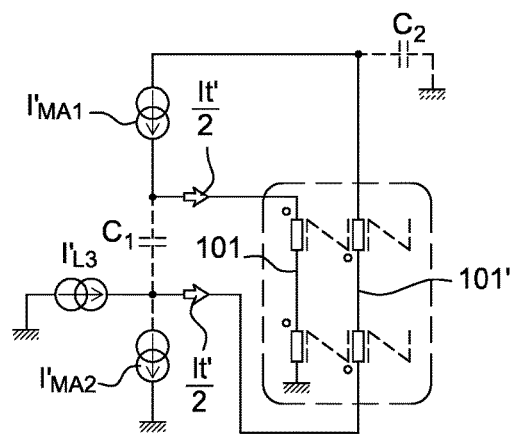
Fig. 9
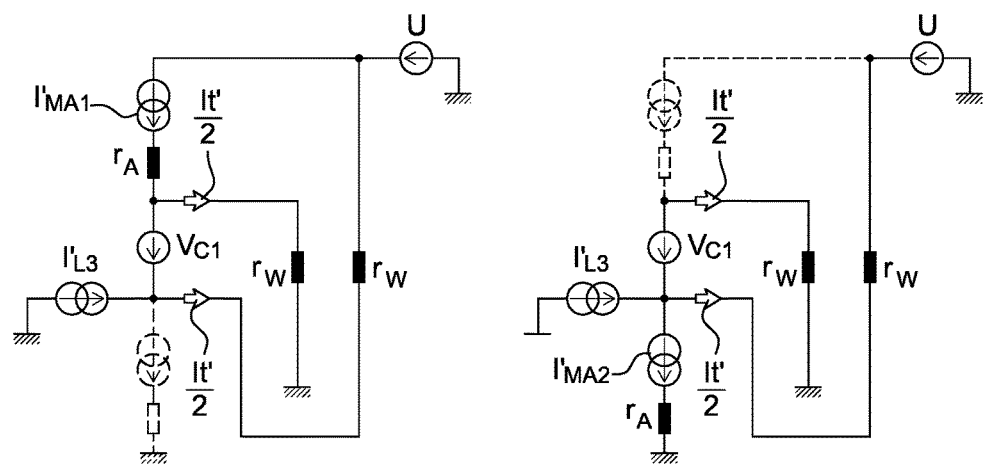
Fig. 10  Fig. 11

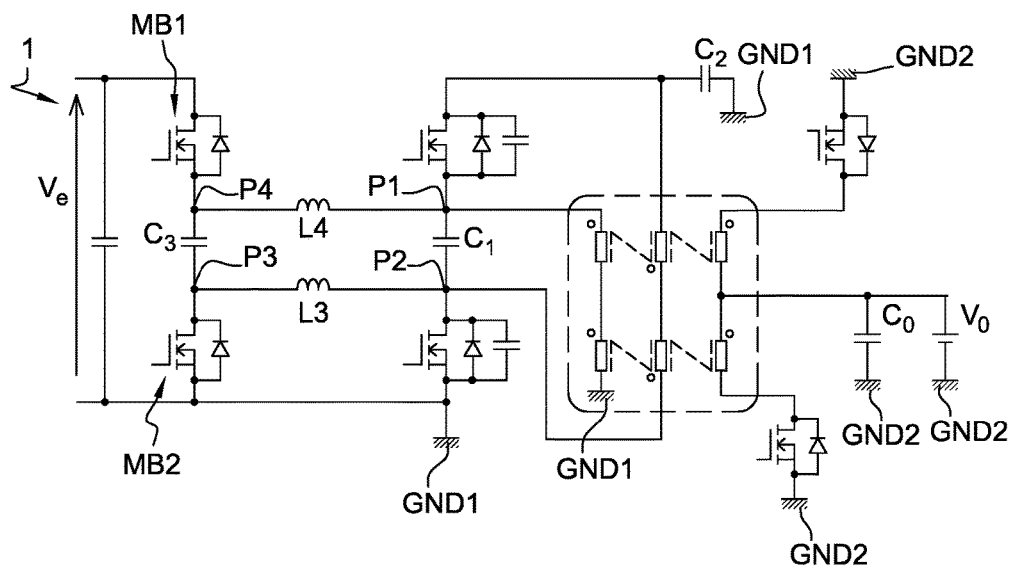
Fig. 12
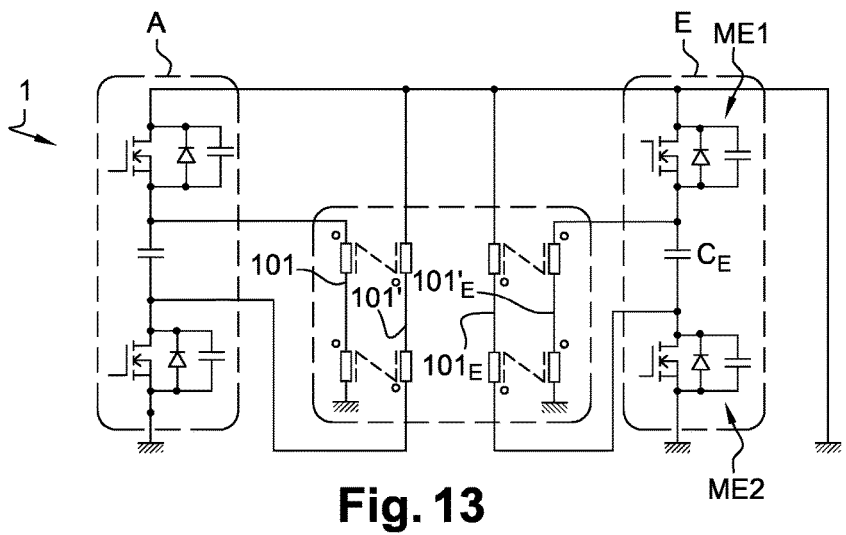
Fig. 13
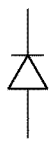 DB Fig. 14

INSULATED DC/DC CONVERTER

The present invention concerns an isolated DC/DC converter and a voltage conversion method implemented using the converter according to the invention.

Within the context of the present application, high voltage is understood to mean a voltage above 60V, for example in the order of 100V or a few hundred volts; low voltage is understood to mean a voltage below 60V, for example in the order of 12V or a few tens of volts.

Isolated DC/DC (for direct current/direct current) converters can have zero voltage switching or ZVS or zero current switching or ZCS that allow a reduction in switching losses during voltage conversion. These converters are therefore particularly advantageous in an automotive application, where the energy resource is limited. In a vehicle, a voltage converter can be used to adapt voltage levels between a plurality of electrical systems in the vehicle or to convert a voltage between an energy source and an electrical load on board the vehicle.

Figure 1:
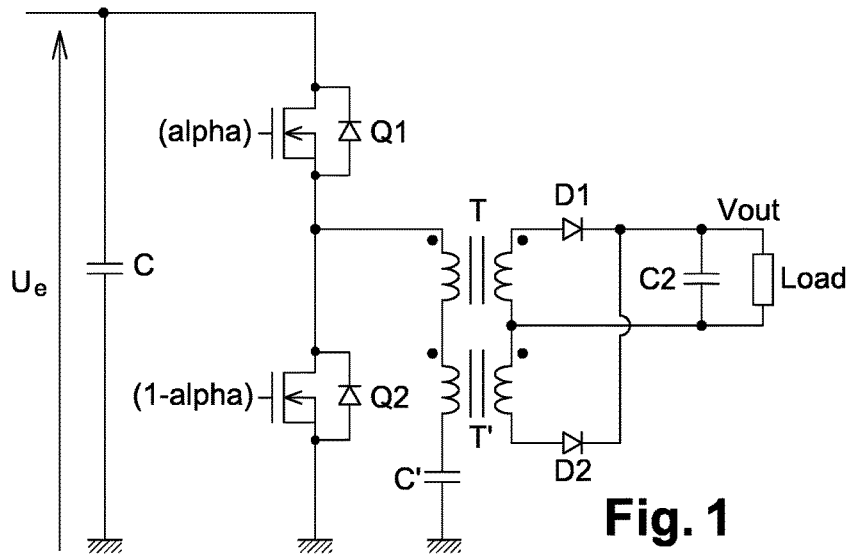

An isolated DC/DC converter is known from the U.S. Pat. No. 5,754,413, which is illustrated in FIG. 1. The converter comprises two switches Q1, Q2 that have their centre point connected to a branch that comprises two transformers T, T' in series. The converter is designed as a half-bridge. The switches control the transmission of energy through the transformers in order to obtain conversion of an input voltage of the converter into an output voltage. Diodes connected to the secondaries of the transformers allow the output signal to be rectified. The output voltage is obtained by controlling the duty cycle of the switches. By modifying the duty cycle in order to attain a target output voltage value, the gain of the converter is adjusted in order to attain the target output voltage value.

The converter comprises a capacitance C' in series with the two transformers T, T'. The capacitance C' allows the DC component of the current received by the two transformers T, T' to be eliminated. In this circuit topology, the capacitance C' carries the current flowing in the transistors T, T'. Now, in certain high-voltage applications, notably applications in an automotive vehicle, the current flowing in the transformers is high, for example in the order of 20 A. By way of example, in a voltage converter of power 3 kW that performs a conversion between 400 and 12V, the capacitance has the following characteristics: 10 µF/300V/20 A rms. These characteristics make the capacitance bulky, which has an impact on the integration of the converter in the vehicle.

Therefore, a solution is sought in order to improve the performance of an isolated DC/DC converter so as to allow it to be used in an automotive vehicle.

In order to solve this problem, the invention concerns an isolated DC/DC converter comprising an isolated circuit having:
  a first arm having a first switch, in series with a second switch;
  a magnetic component having two primary circuits and a secondary circuit that are separated by at least one electrical isolation barrier, said magnetic component being configured so as, during the conversion of an input voltage of the isolated DC/DC converter into an output voltage, to operate as a transformer from the primary circuits to the secondary circuit and as an impedance that stores energy in the primary circuits, and in which:
  the first arm comprises a first capacitance in series with the two switches and situated between the two switches,
  one of said primary circuits, called the second primary circuit, is connected between a first end terminal of the first arm and the connection point, called the second connection point, between the second switch of the first arm and the first capacitance, the first end terminal of the first arm corresponding to the terminal of the first switch that is not connected to the first capacitance; and
  the other primary circuit, called the first primary circuit, is connected between a second end terminal of the first arm and the connection point, called the first connection point, between the first switch and the first capacitance, the second end terminal of the first arm corresponding to the terminal of the second switch that is not connected to the first capacitance.

Notably, successions of opening and closing operations of the switches of the first arm allow an input voltage to be converted into an output voltage by means of the magnetic component.

Notably, the second end terminal is connected to an earth of the isolated DC/DC converter, particularly to an earth on the primary side of the isolated DC/DC converter.

In particular, the output voltage of the isolated DC/DC converter is taken from the terminals of the secondary circuit of the magnetic component.

Within the context of the present application, isolated circuit is understood to mean a circuit comprising at least one electrical isolation barrier between functional elements of the converter.

Owing to the configuration of the magnetic component and of the first capacitance in the isolated DC/DC converter, the current flowing in the first capacitance is smaller than in the prior art, which allows the size of the capacitance used to be reduced. In particular, the current flowing on the primary side in the magnetic component is distributed between the first and second primary circuits, which decreases the current flowing in the first capacitance in relation to the prior art.

According to one embodiment, the magnetic component is configured so that:
  over a first portion of an operating period of the converter, first respective portions of the primary circuits transfer an energy to a first portion of the secondary circuit, and second respective portions of the primary circuits produce inductances storing energy;
  over a second portion of the operating period of the converter, the second respective portions of the primary circuits transfer an energy to a second portion of the secondary circuit, and the first respective portions of the primary circuits produce inductances storing energy.

In particular, the first portions of the primary circuits and of the secondary circuit are perfectly coupled to one another; and the second portions of the primary circuits and of the secondary circuit are perfectly coupled to one another.

In particular, the first arm is controlled using pulse width modulation; the first operating period portion corresponds to a first portion of the modulation period; and the second portion of the operating period corresponds to a second portion of the modulation period. These first and second portions are notably determined by the duty cycle of the first arm.

According to a variant, the magnetic component comprises at least a first and a second isolation transformer in series, the transformers each having two primaries, in which:

the primaries of the first transformer respectively form the first portions of the primary circuits and the secondary of the first transformer forms the first portion of the secondary circuit;

the primaries of the second transformer respectively form the second portions of the primary circuits and the secondary of the second transformer forms the second portion of the secondary circuit.

According to a variant, the primary circuits of the magnetic component respectively comprise a primary winding; and the second circuit of the magnetic component comprises at least one first secondary winding and at least one second secondary winding that are not magnetically coupled to one another, said first and second secondary windings being magnetically coupled to the primary windings.

In particular, the magnetic component is configured to act as a transformer from the primary windings, or to the first secondary winding(s), or to the second secondary winding (s); this while operating as impedances that store energy in the primary windings.

According to one embodiment, the input of the isolated circuit, notably of the isolated DC/DC converter, is at the first end terminal of the first arm. Notably, an input voltage of the isolated circuit, notably of the isolated DC/DC converter, is delivered between the first and second end terminals.

According to one embodiment, the converter comprises a regulating circuit connected to the first end terminal of the first arm and configured to regulate a voltage delivered to the first arm, the regulating circuit being configured to control the output voltage of the isolated DC/DC converter by modifying the voltage delivered to the first arm, the duty cycle of the first arm remaining substantially constant. Notably, the regulating circuit delivers a voltage to the first arm between said end terminals. Notably, the regulating circuit may be a DC/DC converter, particularly a converter of SEPIC, Ćuk, step-down, step-up or step-up/step-down type, or the like.

Thus, an output voltage value that is desired at the output of the isolated DC/DC converter can be obtained without modifying the duty cycle of the first arm. The duty cycle of the first arm can therefore be fixed at a value that allows maximum output from the isolated DC/DC converter, notably for the transmission of energy through the magnetic component.

At a given output voltage of the isolated DC/DC converter, the regulating circuit allows operation of the first arm with a constant duty cycle for any input voltage, particularly one that is in an operating range of the isolated DC/DC converter. By way of example, the difference between the minimum value and the maximum value of the input voltage of the isolated DC/DC converter is between 150 and 500V; by way of example, the minimum value of the input voltage is between 150 and 200V; and the maximum value of the input voltage is between 400 and 500V, or even between 400 and 650V.

According to one variant, a second capacitance is connected between the first end terminal of the first arm and the second end terminal of the first arm.

According to one embodiment, the converter comprises:
a second arm having a first switch and a second electronic element in series, the free terminal of the second electronic element being connected to the second end terminal of the first arm,
an inductance connected between the second connection point and a third connection point, the third connection point corresponding to the terminal of the second electronic element that is close to the first switch of the second arm,
a second capacitance connected between the first end terminal of the first arm and the second end terminal of the first arm,
the second electronic element being a second switch or a diode having its cathode connected to the third connection point,
and in which successions of opening and closing operations of the switch(es) of the second arm allow an input voltage to be converted into an output voltage by means of the magnetic component.

Notably, the input of the isolated DC/DC converter is at the end terminals of the second arm.

The second arm, and the second capacitance and the inductance, help to control the transfer of energy through the magnetic component. The duty cycle of the second arm constitutes a supplementary parameter in the control of the transfer of energy through the magnetic component. Thus, an isolated DC/DC converter is obtained in which control can be refined in order to improve performance, notably as far as the transmission of energy through the magnetic component is concerned.

An output voltage value that is desired at the output of the isolated DC/DC converter can be obtained without modifying the duty cycle of the first arm. The duty cycle of the first arm can therefore be fixed at a value that allows maximum output from the isolated DC/DC converter, notably for the transmission of energy through the magnetic component.

At a given output voltage of the isolated DC/DC converter, the second arm allows operation of the first arm with a constant duty cycle for any input voltage, particularly one that is in an operating range of the isolated DC/DC converter. By way of example, the difference between the minimum value and the maximum value of the input voltage of the isolated DC/DC converter is between 150 and 500V; by way of example, the minimum value of the input voltage is between 150 and 200V; and the maximum value of the input voltage is between 400 and 500V, or even between 400 and 650V.

According to one variant, the second arm is configured to control the output voltage of the isolated DC/DC converter by modifying an electrical parameter of a signal flowing through the inductance.

Thus, a desired output voltage value for the isolated DC/DC converter is obtained by adjusting the electrical parameter of the signal flowing in the inductance. Each desired output voltage value for the isolated DC/DC converter has a corresponding value of the electrical parameter of the signal flowing in the inductance.

According to one variant, the first arm is configured so that its duty cycle has a nominal value and varies around this nominal value according to a difference between a value of the electrical parameter of the signal flowing through the inductance and a value of the electrical parameter of the signal flowing through the magnetic component.

According to one variant, the first arm is configured so that its duty cycle has a nominal value and varies around this nominal value so that the value of the electrical parameter of the signal flowing through the inductance and the value of the electrical parameter of the signal flowing through the magnetic component are equal.

According to one variant, when the duty cycle of the first arm increases, the value of the electrical parameter of the magnetic component increases. When the duty cycle of the first arm decreases, the value of the electrical parameter of the magnetic component decreases.

According to one variant, the duty cycle of the first arm varies around this nominal value by more or less 2% in relation to the nominal value.

According to one variant, the electrical parameter is an average current. In other words, the electrical parameter of the magnetic component is an average current flowing through the inductance; and the electrical parameter of the magnetic component is an average current flowing through the magnetic component, in particular, the sum of the currents flowing through the primary circuits. The electrical parameter may also be an average voltage.

According to one embodiment, the converter moreover comprises:
a third capacitance in series between the first switch of the second arm and the second electronic element of the second arm, the third capacitance being connected between the third connection point and a fourth connection point corresponding to the terminal of the first switch that is close to the second electronic element of the second arm,
another inductance connected between the first connection point (P1) and the fourth connection point.

According to one embodiment, the duty cycle of the first arm remains substantially constant at a nominal value.

According to one embodiment, the nominal value is equal to 50%.

According to one embodiment, the isolated circuit moreover comprises at least one third arm comprising a first switch, a second switch and a fourth capacitance in series with the two switches and situated between the two switches; and in which the magnetic component comprises at least two supplementary primary circuits separated from one another and from the secondary circuit by at least one electrical isolation barrier,
one of said supplementary primary circuits, called the first supplementary primary circuit, is connected between a first end terminal of the third arm and the connection point between the second switch of the third arm and the fourth capacitance, the first end terminal of the third arm (E) corresponding to the terminal of the first switch of the third arm that is not connected to the fourth capacitance; and
the other of said supplementary primary circuits, called the second supplementary primary circuit, is connected between a second end terminal of the third arm and the connection point between the first switch of the third arm and the fourth capacitance, the second end terminal of the third arm (E) corresponding to the terminal of the second switch of the third arm that is not connected to the fourth capacitance,
the end terminals of the first and third arms being respectively connected to one another.

The invention also concerns a voltage conversion method using an isolated DC/DC converter according to the invention, in which control of the output voltage of the isolated DC/DC converter comprises the steps consisting in:
modifying an electrical parameter of a signal flowing through the inductance by varying the duty cycle of the second arm,
varying the duty cycle of the first arm around a nominal value according to a difference between a value of the electrical parameter of the signal flowing through the inductance and a value of the electrical parameter of the signal flowing through the magnetic component.

The method according to the invention can comprise one of the features described above in relation to the isolated DC/DC converter according to the invention.

Figure 2:
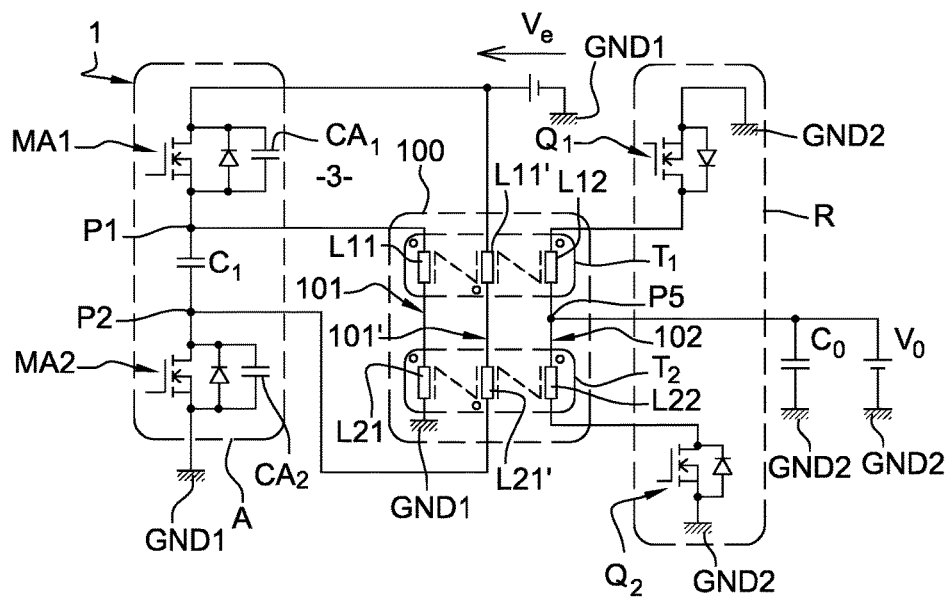
Figure 3:
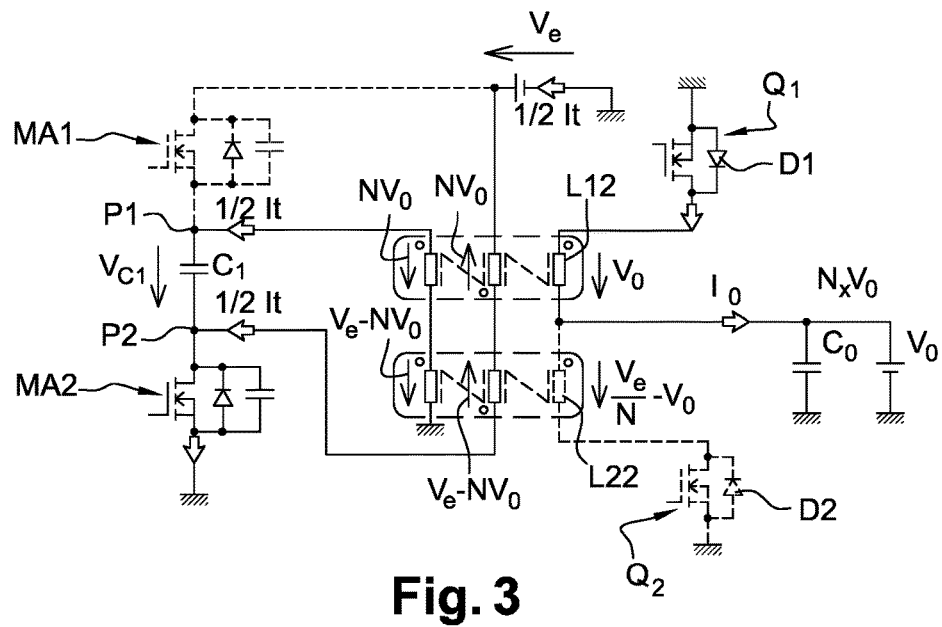
Figure 4:
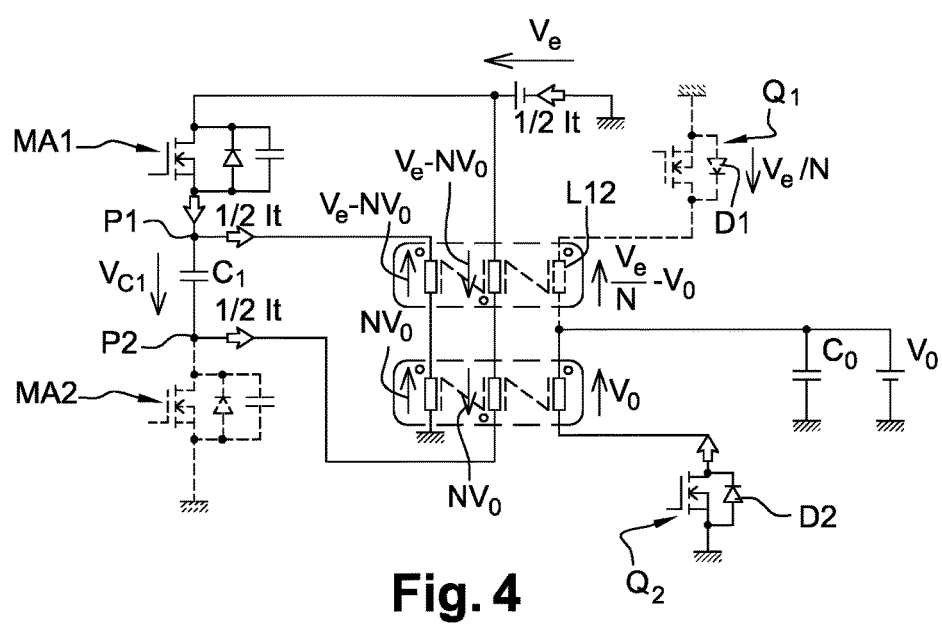
Figure 5:
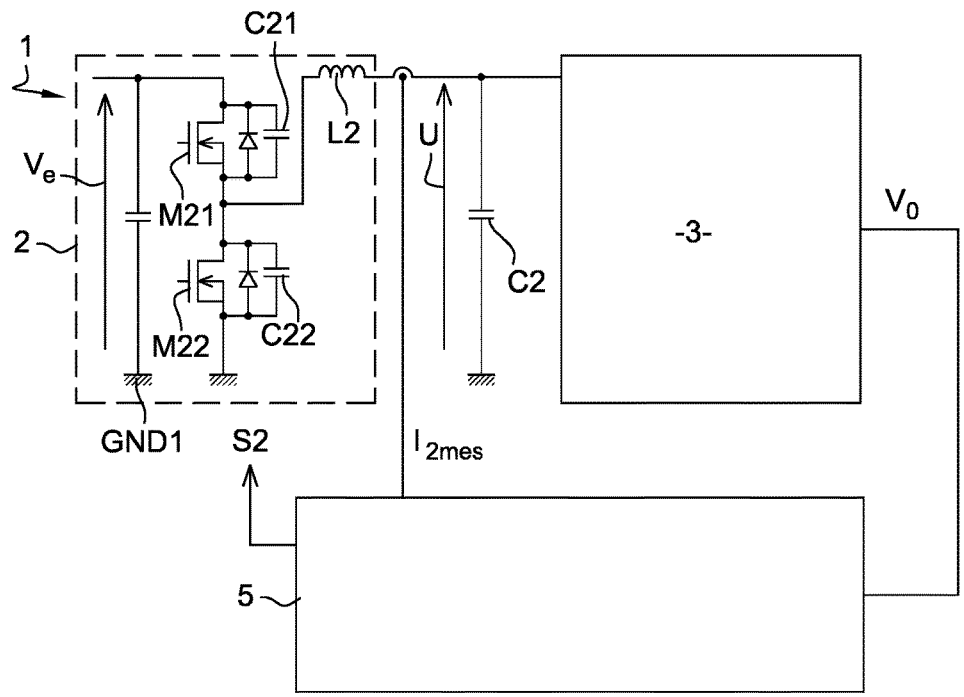
Figure 6:
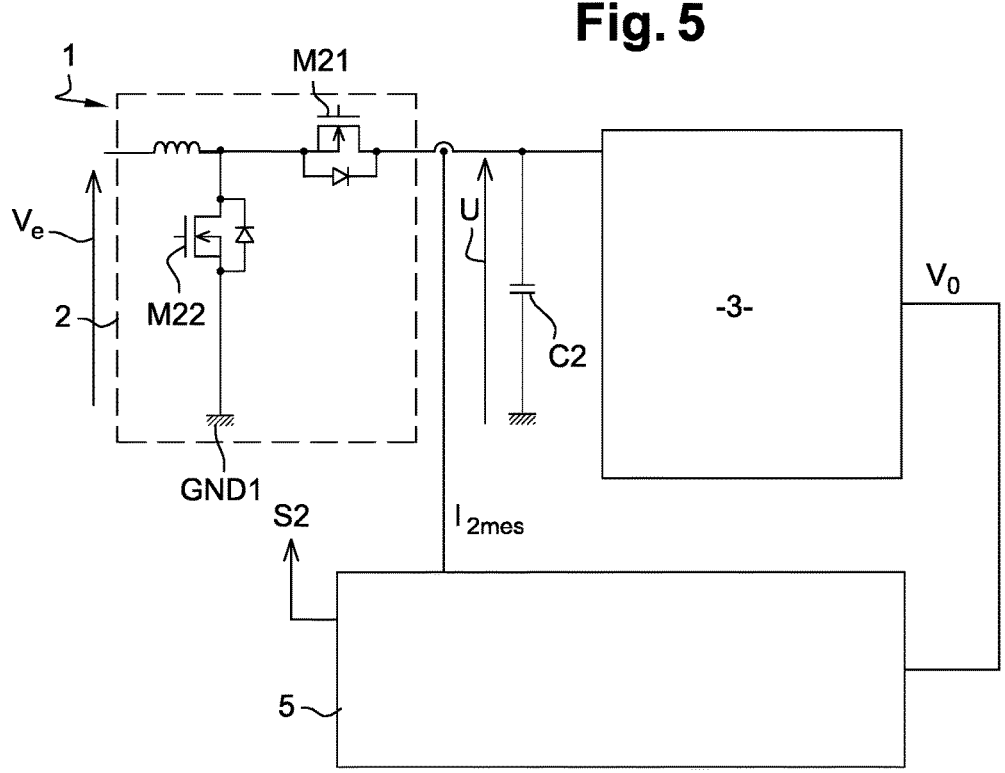
Figure 7:
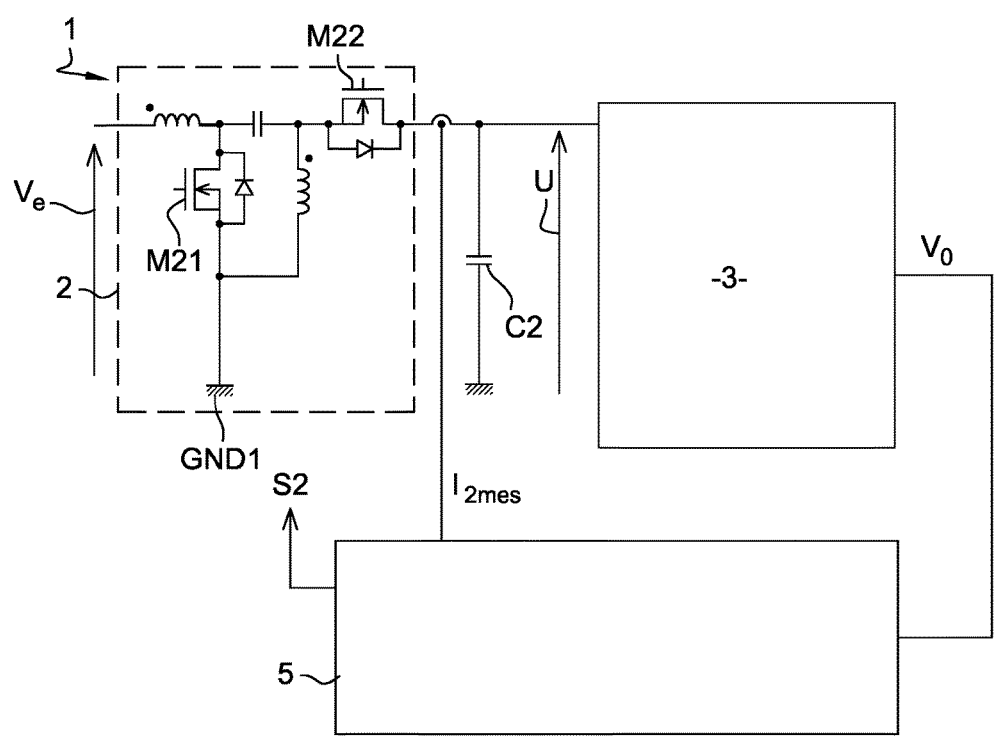
Figure 8:
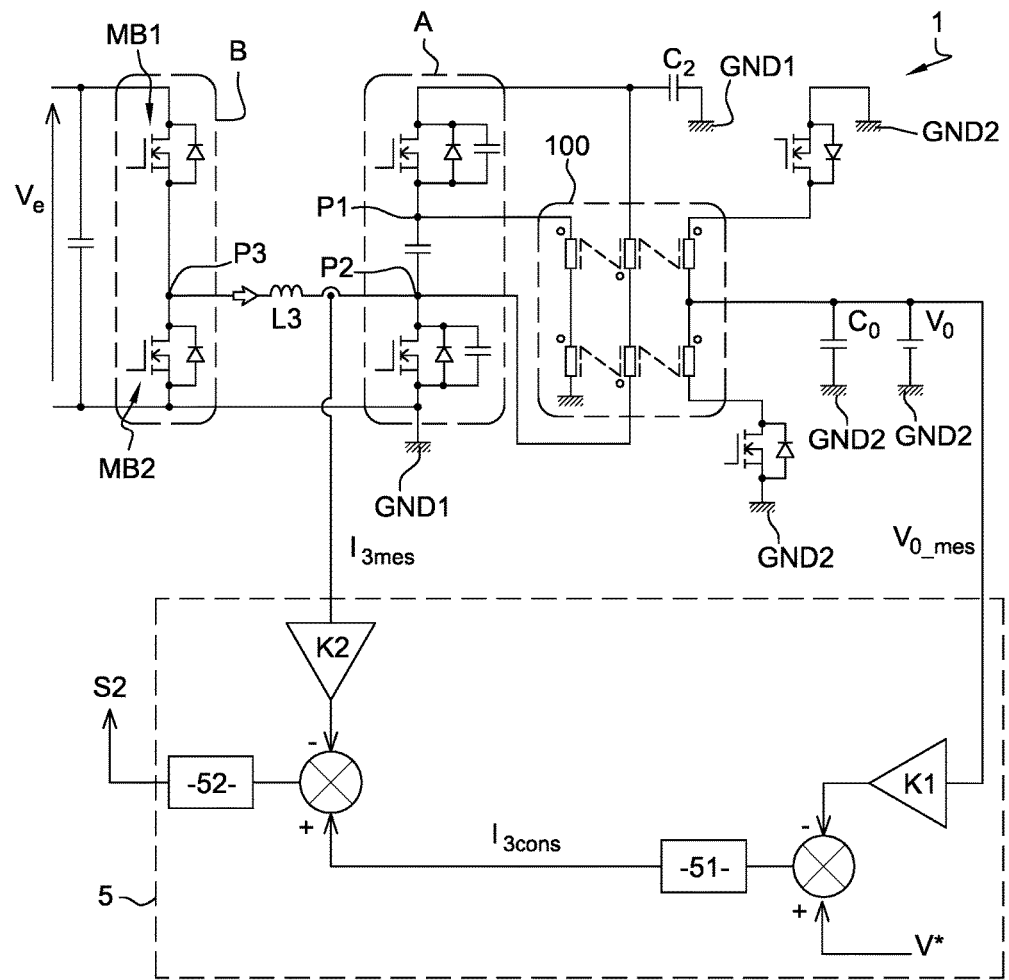

The invention will be better understood with reference to the drawings, in which:
FIG. 1 illustrates an example of an isolated DC/DC converter according to the prior art;
FIG. 2 illustrates an example of an isolated DC/DC converter according to a first embodiment;
FIGS. 3 and 4 illustrate states of the converter in FIG. 2 over two portions of an operating period;
FIGS. 5 to 7 illustrate examples of the converter according to a second embodiment;
FIG. 8 illustrates a third embodiment of the converter according to the invention;
FIGS. 9 to 11 show equivalent diagrams for the circuit in FIG. 8 during its operation;
FIG. 12 illustrates a fourth embodiment of the converter according to the invention;
FIG. 13 illustrates a fifth embodiment that is compatible with the other embodiments of the converter according to the invention;
FIG. 14 illustrates a diode that can replace a switch in the converter examples according to the invention.

The converter according to the invention will be better understood with reference to FIG. 2, which presents an example of an isolated DC/DC converter 1 according to a first embodiment.

The isolated DC/DC converter 1 comprises a first arm A of switches in series. The arm A comprises switches MA1, MA2, from which a succession of opening and closing operations allows the output of the isolated DC/DC converter 1 to be controlled. Notably, the switch MA2, called the second switch or low-side switch, is connected to the low terminal of a voltage source Ve. This low terminal notably corresponds to a first earth GND1 of the isolated DC/DC converter 1. Further, the other switch MA1, called the first switch or high-side switch, is connected to the input voltage Ve at an end terminal of the first arm A.

Each switch MA1, MA2 can comprise a transistor in parallel with a freewheeling diode and/or a capacitance CA1, CA2. These capacitances CA1, CA2 are used to perform zero voltage switching or ZVS when the switches MA1, MA2 open. When a switch MA1, MA2 opens, an inductance is used, notably a leakage inductance of a magnetic component 100 described below, in order to discharge and recharge the capacitance CA1, CA2 that is at the terminals of the switch. Once the voltage is close to 0V, the switch is controlled, and in this way zero voltage switching is produced, which greatly reduces switching losses. These capacitances CA1, CA2 can be inherently present in the structure of the semiconductor making up the switches MA1, MA2, as parasitic elements. The parasitic capacitances of the switches MA1, MA2 can therefore be sufficient to produce the zero voltage switching without the addition of supplementary capacitances. The switches MA1, MA2 could do without these capacitances CA1, CA2.

A first capacitance C1 is in series with the two switches MA1, MA2 and situated between the switches MA1, MA2. Thus, the first capacitance C1 has a first terminal connected to the first switch MA1 at a connection point P1, and a second terminal connected to the second switch MA2 at a second connection point P2. Notably, the first capacitance C1 is connected to the first switch MA1 at the source electrode of the first switch MA1, and is connected to the second switch MA2 at the drain electrode of the second switch MA2.

The isolated DC/DC converter 1 moreover comprises a magnetic component 100 that has a first primary circuit 101, a second primary circuit 101' and a secondary circuit 102 that are separated from one another by electrical isolation barriers. Notably, the first primary circuit 101 forms a branch, one end of which is connected to the first connection point P1 and the other end of which is connected to an end terminal, called the second end terminal, of the first arm A. The second end terminal corresponds to the terminal of the second switch MA2 that is not connected to the first capacitance C1. Further, the second primary circuit 101' forms a branch, one end of which is connected to the second connection point P2 and the other end of which is connected to an end terminal, called the first end terminal, of the first arm A. The first end terminal corresponds to the terminal of the first switch MA1 that is not connected to the first capacitance C1.

In particular, the first primary circuit 101 has a first inductance L11 in series with a second inductance L21. Notably, the positive terminal of the first inductance L11 is connected to the first connection point P1 and the positive terminal of the second inductance L21 is connected to the negative terminal of the first inductance L11. In particular, the second primary circuit 101' has a first inductance L11' in series with a second inductance L21'. Notably, the negative terminal of the first inductance L11' is connected to the first end terminal of the arm A and the negative terminal of the second inductance L21' is connected to the positive terminal of the first inductance L11'. In particular, the secondary circuit 102 has a first inductance L12 in series with a second inductance L22. Notably, the positive terminal of the first inductance L12 is connected to a first secondary-side switch Q1 and the positive terminal of the second inductance L22 is connected to the negative terminal of the first inductance L12.

Notably, the first inductances L11, L11' of the primary circuits 101, 101' and the first inductance L12 of the secondary circuit 102 are perfectly coupled to one another. Equally, the second inductances L21, L21' of the primary circuits 101, 101' and the second inductance L22 of the secondary circuit 102 are perfectly coupled to one another. However, the first inductances L11, L11', L12 of the primary circuits 101, 101' and of the secondary circuit 102 are perfectly decoupled from the second inductances L21, L21', L22 of the primary circuits 101, 101' and of the secondary circuit 102.

The transformation ratio N1 between the first inductance L11 of the first primary circuit 101 and the first inductance L12 of the secondary circuit 102 is equal to the transformation ratio N1' between the first inductance L11' of the second primary circuit 101' and the first inductance L12 of the secondary circuit 102, for example. However, these two transformation ratios N1, N1' could have different values. The transformation ratio N2 between the second inductance L21 of the first primary circuit 101 and the second inductance L21 of the secondary circuit 102 is equal to the transformation ratio N2' between the second inductance L21' of the second primary circuit 101' and the second inductance L22 of the secondary circuit 102, for example. However, these two transformation ratios N2, N2' can have different values. In the text below, the transformation ratios are equal to a value N. The case in which the transformation ratios are different can be deduced from the example below.

In particular, the secondary circuit 102 is connected to a circuit R performing rectification of the signal delivered by the secondary circuit 102 so as to deliver a DC voltage Vo at the output of the isolated DC/DC converter 1. Notably, a first switch $Q_1$ is arranged between a first end of the first inductance L12 of the secondary circuit 102 and a secondary-side earth GND2, and a second switch $Q_2$ is arranged between a first end of the second inductance L22 of the secondary circuit 102 and the secondary-side earth GND2. The second ends of the first L12 and second L22 secondary inductances are connected to a connection point P5 delivering the output voltage Vo of the isolated DC/DC converter 1. By way of example, the switches Q1, Q2 allow synchronous rectification to be obtained at the output of the magnetic component 100.

The rectification of the signal delivered by the secondary circuit 102 could likewise be performed by diodes in a manner that is known per se. For high-current applications in the secondary circuit 102, the use of the switches Q1, Q2 instead of the diodes allows an improvement in the overall output from the isolated DC/DC converter 1.

The voltage converter 1 can also comprise a capacitance Co in order to filter the signal delivered by the secondary circuit 102.

During a conversion of input voltage Ve by the isolated DC/DC converter 1, the magnetic component 100 operates as a transformer from the primary circuits 101, 101' to the secondary circuit 102, and as an impedance that stores energy in the primary circuits 101, 101'. This will be better understood with reference to the examples of operation that are illustrated in FIGS. 3 and 4, in which the instantaneous voltages and currents are represented by arrows.

Notably, the switches MA1, MA2 of the first arm A have a duty cycle that allows an energy to be transferred through the magnetic component 100. The switches MA1, MA2 are particularly controlled by pulse width modulation with a modulation period T. The durations of first and second portions of operation are defined by the duty cycle $\alpha_A$ of the switches MA1, MA2.

In particular, over a first portion of operation, that is to say over a first portion of the modulation period T, which is illustrated in FIG. 3, the high-side switch MA1 is open and the low-side switch MA2 is closed. The first portion of operation has a duration $(1-\alpha_A)T$, where $\alpha_A$ is the duty cycle applied to the first switch MA1 of the first arm A and T is the modulation period. The first switch MA1 is open while the second switch MA2 is on.

In this phase, a voltage −Ve that is the opposite of the input voltage Ve is applied to the magnetic component 100. The voltage reflected in the secondary circuit 102 is likewise negative so that the first diode D1 of the first switch Q1 of the rectifier circuit R is on while the second diode D2 of the second switch Q2 of the rectifier circuit R is off. The second portion L22 of the secondary circuit 102 then behaves like an open switch. The voltage at the terminals of the first portion L12 of the secondary circuit 102 is equal to the opposite −Vo of the output voltage Vo; and therefore the voltage at the terminals of the first portion L11 of the first magnetic circuit is −N×Vo and the voltage at the terminals of the first portion L11' of the second primary circuit 101' is N×Vo. The first portions L11, L11' of the primary circuits 101, 101' therefore allow energy to be transferred to the secondary circuit 102.

The voltage at the terminals of the second portion L21 of the first primary circuit 101 is equal to −(Ve−N×Vo) and the voltage at the terminals of the second portion L21' of the second primary circuit 101' is equal to (Ve−N×Vo). This energy is stored in a resultant magnetizing inductance of the second portion of the magnetic component 100. In the steady state on this first portion, the first capacitance C1 has a voltage VC1 equal to the input voltage Ve. On average, the voltage VC1 at the terminals of the first capacitance C1 during this first portion of operation is $(1-\alpha_A) \times Ve$.

Thus, over the first portion of operation, a first portion of the first primary circuit 101 that is implemented by the first inductance L11 and a first portion of the second primary circuit 101' that is implemented by the second inductance L11' transfer an energy to the secondary circuit 102, in particular to a first portion of the secondary circuit 102 that is implemented by the first inductance L12 of the secondary circuit 102.

A second portion of the first primary circuit 101 that is implemented by the second inductance L21 and a second portion of the second primary circuit 101' that is implemented by the second inductance L21' store energy.

In particular, over a second portion of operation, that is to say over a second portion of the modulation period T, which is illustrated in FIG. 4, the high-side switch MA1 is closed and the low-side switch MA2 is open. The second portion of operation has a duration $\alpha_A T$, where $\alpha_A$ is the duty cycle applied to the first switch MA1 of the first arm A and T is the modulation period.

In this second portion, the voltage at the first connection point P1 is equal to the input voltage Ve. The voltage applied to the first primary circuits 101, 101' is equal to the input voltage Ve. This voltage is positive so that the voltage reflected at the secondary 102 is likewise positive, and turns off the first diode D1 of the first switch Q1 of the rectifier circuit R. The first portion L12 of the secondary circuit 102 therefore behaves as an open switch. However, since the diode D2 of the second switch Q2 of the rectifier circuit R is on, the voltage at the terminals of the second portion L22 of the secondary circuit 102 is equal to the output voltage Vo. The voltage at the terminals of the second portion L21' of the second primary circuit 101' is therefore N×Vo and the voltage at the terminals of the second portion L21' of the first primary circuit 101 is therefore −N×Vo. The energy at the terminals of the second portions L21, L21' of the primary circuits 101, 101' is transferred to the secondary circuit 102.

The voltage at the terminals of the first portion L11 of the first primary circuit 101 is equal to Ve−N×Vo and the voltage at the terminals of the first portion L11' of the second primary circuit 101' is equal to −(Ve−N×Vo), which allows energy to be stored at the resultant magnetizing inductance of the first portion of the magnetic component 100.

The voltage VC1 at the terminals of the first capacitor C1 during this second operating period is $\alpha_A \times Ve$ on average.

Thus, over the second portion of operation, the second portion of the first primary circuit 101, which is implemented by the second inductance L21, and the second portion of the second primary circuit 101', which is implemented by the second inductance L21', transfer an energy to the secondary circuit 102, particularly to the second portion of the secondary circuit 102, which is implemented by the second inductance L22 of the secondary circuit 102. The first portion of the first primary circuit 101, which is implemented by the first inductance L11, and the first portion of the second primary circuit 101', which is implemented by the second inductance L11', store energy.

The voltages at the terminals of the first inductances L11, L11', L12 provide the following relationship:

$$(1-\alpha_A) \times N \times V_o = \alpha_A \times (V_e - N \times V_o)$$

$$V_o = \frac{1}{N} \times \alpha_A \times V_e$$

The voltages at the terminals of the second inductances L21, L21', L22 provide the following relationship:

$$\alpha_A \times N \times V_o = (1-\alpha_A)(V_e - N \times V_o)$$

$$V_o = \frac{1}{N} \times (1-\alpha_A) \times V_e$$

With a duty cycle $\alpha_A$ of the first arm A that remains substantially equal to a constant nominal value $\alpha_N$, it is possible to obtain a non-zero average current in the magnetic component 100. This may be of interest, as will be explained later on.

To avoid the appearance of an average current in the magnetic component 100, the voltages at the terminals of the first inductances L11, L11', L12 and at the terminals of the second inductances L21, L21', L22 can be balanced over the two portions of the operating period.

According to a variant of this first embodiment, the duty cycle $\alpha_A$ has a constant nominal value equal to 50%. Balancing of the first inductances L11, L11' and L12 and balancing of the second inductances L21, L21' and L22 are then obtained, which reduces losses in the isolated DC/DC converter.

Moreover, at a duty cycle of 50%, the current at the output of the isolated DC/DC converter 1, more particularly at the output of the magnetic component 100, has ripples that are small because the ripples in the currents in the magnetizing inductances of the isolated DC/DC converter, particularly those of the magnetic component 100, are compensated for.

In particular, the voltage stresses at the terminals of the diodes D1, D2 of the switches Q1, Q2 of the secondary circuit 102 are dependent on the duty cycle $\alpha_A$, and are provided by the following expressions:

$$V(D1) = V_o/(1-\alpha_A) \text{ and } V(D2) = V_o/\alpha_A$$

With a duty cycle $\alpha_A$ equal to 50%, the voltage stresses at the terminals of two diodes D1, D2 are equal, and the wear is the same between the diodes.

The table below shows a comparison between an isolated DC/DC converter from the prior art such as the one in FIG. 1 and the isolated DC/DC converter illustrated in FIG. 2. By taking a transformation ratio N equal to 2 for the transformer of the converter in FIG. 1 and equal to 4 for the converter in FIG. 2, for an input voltage Ve of 200V, an output voltage Vo of 25V with an output current Io, and a duty cycle $\alpha_A$ equal to 50%, the following features are obtained:

| | FIG. 1 | FIG. 2 |
|---|---|---|
| Voltage V at the terminals of the 1$^{st}$ or of the 2$^{nd}$ switch | V = 200 V | V = Ve + VC1 = 400 V |
| Voltage V at the secondary 102 | V = αA × Vo = 40 V | V = αA × Vo = 40 V |
| Voltage at the terminals of the capacitances C', C1 | VC' = αA × Ve = 100 V | VC1 = Ve = 200 |
| Total current It at the primary of the magnetic component | $I_t = \frac{I_o}{2N} = \frac{I_o}{4}$ | $I_t = \frac{I_o}{2N} = \frac{I_o}{8}$ |

-continued

| | FIG. 1 | FIG. 2 |
|---|---|---|
| Peak current flowing in the capacitance C', C1 | $I_{C'} = \dfrac{I_o}{4}$ | $I_{C1} = \dfrac{I_o}{16}$ |

It should be noted that, for FIG. 2, the total current It at the primary corresponds to the sum of the currents flowing in the first 101 and the second 101' primary circuit.

Thus, in the isolated DC/DC converter of the prior art, the capacitance C' in series with the transformers T, T' sees a larger current than the first capacitance C1 in the isolated DC/DC converter 1 according to the invention. The current $I_{C1}$ passing through the capacitance C1 in the converter in FIG. 2 is twice as small as the current $I_{C'}$ passing through the capacitance C' in the converter in FIG. 1, because the transformation ratio is 4 in the converter in FIG. 2 instead of 2 in the converter in FIG. 1. More generally, the currents flowing in the primary circuits 101, 101' of the magnetic component 100 in the isolated DC/DC converter 1 according to the invention are not as high as in the prior art. In particular, the capacitance C1 of the converter 1 in FIG. 2 sees only the current in a single primary circuit at a time, which divides the current by four in relation to the circuit in FIG. 1. The converter 1 according to the invention therefore allows a reduction in losses due to the current in relation to the prior art.

According to a second embodiment that is illustrated in FIGS. 5 to 7, the converter 1 comprises an isolated circuit 3 as shown in FIG. 2 and a circuit 2 for regulating the input voltage U delivered to the circuit 3. The regulating circuit 2 is connected to the first end terminal of the first arm A.

The regulating circuit 2 controls the output voltage Vo from the isolated DC/DC converter 1 by modifying the voltage U delivered to the first arm A. Thus, the output voltage Vo of the isolated DC/DC converter 1 can be modified even if the duty cycle $\alpha_A$ of the first arm A remains constant and equal to the nominal value arr. Thus, the switches M21, M22, MA1, MA2 of the circuits 2, 3 have successions of opening and closing operations that allow the output signal of the isolated DC/DC converter 1 to be controlled.

In the example illustrated in FIG. 5, the regulating circuit 2 is a step-down DC/DC converter, but it could be another type of DC/DC converter as illustrated in FIGS. 6 and 7. The regulating circuit 2 notably comprises two switches M21, M22 in series. In particular, the switch M21, called the high-side switch, is connected to the high terminal of a voltage source (not shown) delivering an input voltage Ve; and the switch M22, called the low-side switch, is connected to the low terminal of the voltage source. This low terminal notably corresponds to the first earth GND1 of the converter 1. Each switch M21, M22 can comprise a transistor in parallel with a freewheeling diode.

Each switch M21, M22 can comprise a capacitance C21, C22 in parallel. These capacitances C21, C22 are notably used to perform zero voltage switching or ZVS when the switches open. While a switch M21, M22 is opening, the energy stored in an inductance is recovered in order to discharge and recharge the capacitance C21, C22 that is at the terminals of the switch. Once the voltage is closed to 0V, the switch is controlled and thus zero voltage switching is performed, which greatly reduces switching losses.

Notably, an inductance L2 has a first terminal connected to the centre point of the two switches M21, M22 and a second terminal connected to the input of the isolated circuit 3.

A second capacitance C2 can be connected between the first end terminal of the first arm A and the second end terminal of the first arm A. This second capacitance C2 is therefore likewise connected between the second terminal of the inductance L2 and the first earth GND1 of the converter 1. This second capacitance C2 allows provision of the interface between the circuits 2, 3, for example.

In this embodiment, the switches MAL MA2 of the first arm A moreover operate with a duty cycle $\alpha_A$ that does not vary, that is to say that remains constant over the course of time and equal to a nominal value $\alpha_N$. During operation of the converter 1, the output voltage Vo of the isolated circuit 3, that is to say the output voltage of the isolated DC/DC converter 1, is controlled by the voltage delivered by the regulating circuit 2 at the input of the isolated circuit 3.

To this end, the converter 1 can comprise a control unit 5 for the regulating circuit 2. The control unit 5 delivers a pulse width modulation or PWM signal S2 that controls the opening and closing of the switches M21, M22 of the regulating circuit 2 in order to control the electrical signal delivered by the regulating circuit 2. The switches M21, M22 are controlled so that the voltage U delivered at the input of the isolated circuit 3, that is to say at the output of the regulating circuit 2, allows a desired voltage Vo value to be obtained at the output of the isolated DC/DC converter 1. Thus, it is not necessary to vary the duty cycle $\alpha_A$ of the isolated circuit 3 in order to attain a desired output voltage Vo. The isolated circuit 3 can therefore operate at its most advantageous duty cycle, notably at 50%. The control unit 5 can use a measurement I2mes of the current delivered by the regulating circuit 2 in order to improve the precision of the pulse width modulation signal S2.

In particular, when the input voltage Ve of the voltage converter 1 varies, the regulating circuit 2 makes it possible to ensure that the voltage U at the input of the isolated circuit 3 keeps a value that allows the desired output voltage Vo to be obtained. Thus, if the input voltage Ve of the converter 1 changes value, the control unit 5 modifies the control of the duty cycles of the switches M21, M22 of the regulating circuit 2 in corresponding fashion in order to maintain the voltage U at the output of the regulating circuit 2, that is to say at the input of the isolated circuit 3. This is particularly advantageous in an electric vehicle, where the level of charge of a battery can vary over the course of time.

At a duty cycle of 50% in the first arm A, the average current in the magnetic component 100 is zero and allows a decrease in the current ripples at the output of the isolated DC/DC converter as explained above for the first embodiment.

The control unit 5 can moreover ensure protection of the isolated circuit 3. By way of example, in the case of a short circuit in the load at the output of the isolated DC/DC converter 1, the control unit 5 can protect the isolated circuit 3 by acting on the controls S2 from the regulating circuit 2 so as to cancel the voltage U at the input of the isolated circuit 3 in order to protect it.

The converter 1 may be designed to cover an operating range. The operating range corresponds to an input voltage Ve of the converter 1 between a minimum value $Ve_{min}$ and a maximum value $Ve_{max}$; and to an output voltage Vo between a minimum value $Vo_{min}$ and a maximum value $Vo_{max}$. By way of example, the input voltage Ve is between 170 and 450V; and the target voltage Vo at the output of the isolated circuit 1 is between 12 and 16V. By way of example, the minimum value $Vo_{min}$ of the output voltage is between 8 and 14V and the maximum value $Vo_{max}$ of the output voltage is between 15 and 16V.

In the example in FIG. 5, the regulating circuit 2 is a step-down DC/DC converter. The converter 1, particularly the regulating circuit 2, is then configured to be able to deliver the maximum output voltage $Vo_{max}$ with the minimum voltage $Ve_{min}$. The converter examples illustrated in FIGS. 6 and 7 are similar to the example in FIG. 5, but differ by virtue of the regulating circuit 2. FIG. 6 illustrates an example of a converter 1 in which the regulating circuit 2 is a step-up circuit that is known per se. The converter 1, particularly the regulating circuit 2, is then configured to be able to deliver the minimum output voltage $Vo_{min}$ with the maximum input voltage $Ve_{max}$. FIG. 7 illustrates another example of a converter in which the regulating circuit 2 is a step-up/step-down SEPIC circuit that is known per se. In this example, the regulating circuit 2 can lower or raise the voltage, which facilitates use of the regulating circuit 2.

According to a third embodiment that is illustrated in FIG. 8, the isolated DC/DC converter 1 comprises a second arm B of switches in series. The second arm B comprises two switches MB1, MB2 that are directly in series. A first switch MB1, called the high-side switch, is connected to the high terminal of a voltage source (not shown) delivering an input voltage Ve. A second switch MB2, called the low-side switch, is connected to the second end terminal of the first arm A. The second switch MB2 is moreover connected to the low terminal of the voltage source. This low terminal therefore corresponds to the first earth GND1 of the isolated DC/DC converter 1. Each switch MB1, MB2 can comprise a transistor in parallel with a freewheeling diode.

A third inductance L3 has a first terminal connected to the centre point of the second arm B, and a second terminal connected to the second connection point P2. A second capacitance C2 is connected between the end terminals of the first arm A. The second arm B could likewise comprise capacitances for soft switching of its switches MB1, MB2. However, this would introduce current ripples in the third inductance L3 that are capable of bringing about losses. The result of this would be that the advantage of the soft switching of the switches MB1, MB2 of the second arm B could be lost.

A succession of opening and closing operations of the switches MA1, MA2, MB1, MB2 of the first A and the second B arm allow the output of the isolated DC/DC converter 1 to be controlled. In the example illustrated in FIG. 2, the transmission of energy through the magnetic component 100 is controlled by the switches MA1, MA2 of the first arm A. In the isolated DC/DC converter 1 according to this embodiment, the second arm B likewise allows this transmission of energy to be controlled. The reason is that in the example illustrated in FIG. 2, the voltage between the end terminals of the first arm A is equal to the input voltage Ve of the isolated DC/DC converter 1. By contrast, in the isolated DC/DC converter 1 illustrated in FIG. 8, the voltage U at the terminals of the first arm A, that is to say at the terminals of the second capacitance C2, is provided by the expression:

$$U = \frac{\alpha_B}{\alpha_A} \times V_e,$$

where $\alpha_A$ is the duty cycle of the first arm A and $\alpha_B$ is the duty cycle of the second arm B.

Thus, in the isolated DC/DC converter 1 illustrated in FIG. 8, the duty cycle $\alpha_B$ of the second arm B constitutes, in relation to the example illustrated in FIG. 2, a supplementary parameter in the control of the transfer of energy through the magnetic component 100. The control of the isolated DC/DC converter 1 is therefore refined in this third embodiment.

Moreover, the range of values that can be accessed by the voltage U at the terminals of the first arm A is above the range of values that can be accessed by the voltage at the terminals of the first arm A in the converter illustrated in FIG. 2. The reason is that if the ratio $\alpha_B/\alpha_A$ is above 1, then the voltage U at the terminals of the first branch A is above the input voltage Ve. In particular, the voltage U may be above a maximum value $Ve_{max}$ of the input voltage Ve. The voltage U at the terminals of the first branch A may therefore be higher than the input voltage Ve of the isolated DC/DC converter 1, in contrast to the case of the converter that is illustrated in FIG. 2. Equally, if the ratio $\alpha_B/\alpha_A$ is below 1, then the voltage U at the terminals of the first arm A is below the input voltage Ve. In particular, the voltage U may be below a minimum value $Ve_{min}$ of the input voltage Ve. The voltage U at the terminals of the first arm A may therefore be lower than the input voltage Ve of the isolated DC/DC converter 1, in contrast to the case of the converter that is illustrated in FIG. 2.

It may be noted that this property of lowering or raising the input voltage Ve can be implemented in an isolated DC/DC converter 1 according to the second embodiment by using a step-up/step-down converter therein as a regulating circuit 2. The converter 1 obtained would therefore have two supplementary arms of switches in relation to the first arm A. The total number of arms of switches would therefore be three on the primary side of the converter 1. By contrast, in the converter according to this embodiment, the property of lowering or raising the input voltage is obtained with two arms A, B of switches MA1, MA2, MB1, MB2 on the primary side of the converter 1.

According to a first variant of this third embodiment, the switches MA1, MA2 of the first arm A operate with a duty cycle $\alpha_A$ that does not vary, that is to say that remains constant over the course of time. The duty cycle $\alpha_A$ remains substantially equal to a nominal value $\alpha_N$. During the operation of the isolated DC/DC converter 1, the output voltage Vo is controlled by the current flowing in the third inductance L3. This current is controlled by the second arm B. To this end, the isolated DC/DC converter 1 can comprise a control unit 5 for the second arm B. The control unit 5 delivers a pulse width modulation signal S2 that controls the opening and closing of the switches MB1, MB2 of the second arm B in order to control the current flowing in the third inductance L3. The switches MB1, MB2 of the second arm B are controlled so that the current flowing in the third inductance L3 allows a desired voltage Vo value to be obtained at the output of the isolated DC/DC converter 1. Thus, it is not necessary to vary the duty cycle $\alpha_A$ of the switches MA1, MA2 of the first arm A. The first arm A can therefore operate at its most advantageous duty cycle $\alpha_A$ for the transmission of energy by the magnetic component 100, notably at 50%.

At a duty cycle of 50% in the first arm A, the average current in the magnetic component 100 is zero and allows a decrease in the current ripples at the output of the isolated DC/DC converter as explained above for the first embodiment.

The voltage U at the terminals of the first branch A is then equal to $2\alpha_B$Ve. For the duty cycle $\alpha_B$ of the second arm B, it is possible to vary the voltage U at the terminals of the first arm A. If the duty cycle $\alpha_B$ of the second arm B is below 50%, the voltage U at the terminals of the first arm A is below 2 Ve. If the duty cycle $\alpha_B$ of the second arm B is above 50%, the voltage U at the terminals of the first arm A is above 2 Ve. A duty cycle $\alpha_A$ of 50% for the first arm A therefore allows simple control of the isolated DC/DC converter 1.

In particular, when the input voltage Ve of the voltage converter 1 varies, the second arm B makes it possible to ensure that the output voltage Vo keeps a desired value. Thus, if the input voltage Ve of the isolated DC/DC converter 1 changes value, the control unit 5 modifies the control of the duty cycles $\alpha_B$ of the switches MB1, MB2 of the second arm B in corresponding fashion in order to maintain the current flowing through the third inductance L3 at a desired value. This is particularly advantageous in an electric vehicle, where the level of charge of a battery can vary over the course of time.

More particularly, the control unit 5 produces a first feedback loop that enslaves the current flowing through the third inductance L3 connected between the first A and second B arms to a difference between the value Vo_mes of the output voltage of the isolated DC/DC converter 1 and a desired voltage Vo at the output of the isolated DC/DC converter 1. To this end, the control unit 5 receives the voltage Vo_mes measured at the output of the isolated DC/DC converter 1, possibly multiplied by a gain K1. The control unit 5 then compares a setpoint voltage V* with the measured voltage Vo_mes. The setpoint voltage V* corresponds to the voltage Vo desired at the output of the isolated DC/DC converter 1. According to the result of the comparison, a controller 51 delivers to the second arm B a setpoint current I3cons that has to flow through the third inductance L3.

The setpoint current I3cons can be transmitted directly to a controller 52 that delivers to the second arm B the PWM signal S2 from the setpoint current I3cons. However, the control unit 5 can produce a second loop that enslaves the current flowing through the third inductance L3 to a difference between the value I3mes of the current flowing through the third inductance L3 and the setpoint current I3cons. In particular, the control unit 5 compares the setpoint current I3cons that is output by the first loop with the current I3mes measured on the third inductance L3. The current I3cons is possibly multiplied by a gain K2 before the comparison. According to the result of this comparison, the controller 52 determines the signal S2 for controlling the duty cycle $\alpha_B$ of the switches MB1, MB2 of the second arm B so as to adjust the current flowing through the third inductance L3. Voltage loops could be used. However, the current loop is easier to implement because, at a small signal, the current loop makes it possible to have a transfer function of the first order, whereas the voltage loop is of the second order. Moreover, the isolated DC/DC converter 1 could implement the first loop without using the second loop.

As in the second embodiment, the isolated DC/DC converter 1 according to the third embodiment can be designed to cover an operating range. The operating range corresponds to an input voltage Ve of the isolated DC/DC converter 1 that is between a minimum value $Ve_{min}$ and a maximum value $Ve_{max}$; and to an output voltage Vo that is between a minimum value $Vo_{min}$ and a maximum value $Vo_{max}$. By way of example, the input voltage Ve is between 170 and 450V; and the target voltage Vo at the output of the isolated DC/DC converter 1 is between 12 and 16V. By way of example, the minimum value $Vo_{min}$ of the output voltage is between 8 and 14V and the maximum value $Vo_{max}$ of the output voltage is between 15 and 16V.

In a second variant of the third embodiment, the duty cycle $\alpha_A$ of the first arm A varies around the nominal value $\alpha_N$ according to an electrical parameter I' of the signal flowing through the third inductance L3. The advantage of this variant will be understood from what follows.

In a first portion of the operating period T that is close to that illustrated in FIG. 3, the second switch MA2 of the first arm A is closed and the first switch MA1 of the first arm A is open. The second switch MA2 then carries a current from the third inductance L3 and a current It from the magnetic component 100. These currents are added together because they flow in the same direction. In a second portion of the operating period T that is close to that illustrated in FIG. 4, the second switch MA2 of the first arm A is open and the first switch MA1 of the first arm A is closed. The first switch MA1 then carries a current from the third inductance L3 and the current It from the magnetic component 100. These currents are subtracted from one another because they do not flow in the same direction.

Thus, the first switch MA1 and the second switch MA2 do not see the same current in the course of the operation of the isolated DC/DC converter 1. The second switch MA2 carries a higher current than the first switch MA1, which creates an imbalance between the losses when the first switch MA1 is closed and the losses when the second switch MA2 is closed. The second switch MA2 wears more quickly than the first switch MA1 because it receives a higher current.

One solution would involve doubling the second switch MA2, that is to say replacing the second switch MA2 with two switches in parallel. However, this complicates the circuit and does not always guarantee that the same current flows between the two switches that are in parallel.

One way of balancing the losses between the two switches MA1, MA2 of the first arm A involves using an electrical parameter of the magnetic component 100, such as its average current I'$_T$, in order to rebalance the currents flowing in the first switch MA1 and the second switch MA2.

FIG. 9 shows an equivalent diagram for the isolated circuit 3 in the steady state. The average current in the first capacitance C1 is zero. It can be observed that the average current I'MA1 flowing in the first switch MA1 is equal to the average current I'$_T$/2 flowing in the first primary circuit 101, where I'$_T$ is the total average current flowing in the two primary circuits 101, 101'. It can moreover be observed that the average current I'MA2 flowing in the second switch MA2 is equal to the average current I'L3 flowing in the third inductance L3 less the average current I'$_T$/2 flowing in the second primary circuit 101'. The average currents I'MA1, I'MA2 flowing in the first MA1 and the second MA2 switch are equal if the average current I'$_{L3}$ flowing in the third inductance L3 is equal to the total average current I'$_T$ flowing in the two primary circuits 101, 101'.

FIG. 10 shows an equivalent diagram for the isolated circuit 3 over the first portion of the operating period T. FIG. 11 shows an equivalent diagram for the isolated circuit 3 over the second operating period T. The following relationship is deduced therefrom:

$$I'_t = \frac{2 \times r_A}{r_T + r_A} \times (1 - \alpha_A) \times I'_{L3} + (2\alpha_A - 1) \times \frac{U}{r_T + r_A}$$

where $r_A$ is the equivalent resistance of each switch MA1, MA2, assuming that it is the same for each switch; $r_T$ is the equivalent resistance of the magnetic component 100, which is obtained from the equivalent resistances $r_w$ of the primary circuits 101, 101', notably $$r_T = \frac{r_w}{2};$$

U is the voltage at the first end terminal of the first arm A.

Thus, by acting on the duty cycle $\alpha_A$ of the first arm A, it is possible to modify the value of the average current $I'_T$ flowing in the magnetic component 100 so that it is equal to the average current $I'_{L3}$ delivered by the third inductance L3 to the second connection point P2. In particular, by increasing the duty cycle $\alpha_A$ of the first arm A, the average current $I'_T$ flowing in the magnetic component 100 is increased; by decreasing the duty cycle $\alpha_A$ of the first arm A, the average current $I'_T$ flowing in the magnetic component 100 is decreased.

Small variations round the nominal value $\alpha_N$ of the duty cycle $\alpha_A$ of the first arm A are sufficient in order to adjust the average current $I'_T$ flowing in the magnetic component 100. Notably, the duty cycle varies around this nominal value $\alpha_N$ by more or less 2% in relation to the nominal value arr. This nominal value $\alpha_N$ is equal to 50%, for example, because of the advantages mentioned above.

The adjustment of the average current $I'_T$ flowing in the magnetic component 100 can be obtained by a feedback loop that enslaves the duty cycle $\alpha_A$ of the first arm A according to a difference between the average current $I'_T$ flowing in the magnetic component 100 and the average current $I'_{L3}$ delivered by the third inductance L3 to the second connection point P2. By way of example, for a cut-off frequency of 300 kHz, the feedback loop operates at a frequency of between 2 and 3 kHz. The measurements of the current flowing in the magnetic component 100 and in the third inductance L3 are taken at a frequency of 20 kHz.

Notably, the average current $I'_T$ flowing in the magnetic component 100 is measured over contiguous cut-off periods of the first arm A, and the average current $I'_{L3}$ delivered by the third inductance L3 is measured over contiguous cut-off periods of the second arm B.

FIG. 12 illustrates an isolated DC/DC converter 1 according to a fourth embodiment. The converter 1 illustrated in FIG. 12 is similar to that illustrated in FIG. 8, albeit that it comprises a third capacitance C3 and a fourth inductance L4. The third capacitance C3 is connected between the first switch MB1 of the second arm B and the second switch MB2 of the second arm B. Thus, the third capacitance C3 is in series between the first switch MB1 and the second switch MB2 of the second arm B. The third inductance L3 is connected to the connection point P3 between the third capacitance C3 and the second switch MB2. The fourth inductance L4 is connected between the first connection point P1 and a fourth connection point P4 between the first switch MB1 and the third capacitance C3.

By adding the third capacitance C3 and the fourth inductance L4, the voltage range that can be attained by the isolated DC/DC converter 1 is increased in relation to the converter illustrated in FIG. 8. The isolated DC/DC converter 1 according to this fourth embodiment forms a step-up/step-down DC/DC converter. This will be better understood from what follows.

In the converter, the average voltage of an inductance is equal to zero. The result of this is that the average voltage at the first connection point P1 is equal to the average voltage of the fourth connection point P4; and the average voltage at the third connection point P3 is equal to the average voltage at the second connection point P2. The average voltage at the terminals of the third capacitance C3 is therefore equal to the average voltage at the terminals of the first capacitance C1.

Moreover, the result of this is likewise that the average voltage at the first connection point P1 is zero. The average voltage at the second connection point P2 is equal to the average voltage VC2' at the terminals of the second capacitance C2. Therefore, the average voltage VC2' at the terminals of the second capacitance C2 is equal to the average voltage VC1' of the first capacitance C1.

By controlling the switches MB1, MB2 of the second arm B with a duty cycle $\alpha_B$, the average voltage $Vp_4'$ at the fourth connection point P4 is provided by the relationship $Vp4' = \alpha \times Ve - (1-\alpha) \times VC3'$ therefore $$Vc3' = Vc2 = \frac{\alpha}{1-\alpha} \times Ve$$

This relationship shows that the voltage VC2 at the terminals of the capacitance C2 can be controlled by the duty cycle $\alpha_B$ of the second arm B. Thus, when the duty cycle $\alpha_B$ of the second arm B is below 1, the converter 1 operates as a voltage step-down converter, and when the duty cycle $\alpha_B$ is above 1, the converter 1 operates as a voltage step-up converter.

The converter according to this fourth embodiment can operate in a similar manner to the converter according to the third embodiment. The converter according to this fourth embodiment makes it possible to attain a larger operating range than the converter according to the third embodiment. The reason is that in the third embodiment, the minimum voltage that is admissible at the input of the isolated DC/DC converter 1 is limited by the voltage of the second capacitance C2, the voltage of the second capacitance C2 being dependent on the output voltage Vo. By contrast, in the fourth embodiment, the minimum voltage is not limited by the voltage at the terminals of the second capacitance C2.

In the converter according to the invention, the magnetic component 100 can comprise a first T1 and a second T2 transformer in series. Each transformer T1, T2 has two primaries. The primaries of the first transformer T1 respectively form the first portion L11 of the first primary circuit 101 and the first portion L11' of the second primary circuit 101'; and the secondary of the first transformer T1 forms the first portion L12 of the secondary circuit 102. The primaries of the second transformer T2 respectively form the second portion L21 of the first primary circuit 101 and the second portion L21' of the second primary circuit 101'; and the secondary of the second transformer T2 forms the second portion L22 of the secondary circuit 102.

The magnetic component 100 can be implemented differently. By way of example, the first primary circuit 101 can be implemented with a single first primary winding and the second primary circuit 101' can likewise be implemented with a single second primary winding. The secondary circuit 102 can be implemented with two secondary windings. These windings are notably wound around a common magnetic core. The two secondary windings are magnetically coupled to the primary windings but are not magnetically coupled to one another. In particular, the first L11 and second L21 portions of the first primary circuit 101 are respectively implemented with a first and a second portion of the first primary winding. In particular, the first L11' and second L21' portions of the secondary primary circuit 101 are respectively implemented with a first and a second portion of the second primary winding. Such a way of implementing the magnetic component 100 allows not only a reduction in the cost of the converter 1 by reducing the number of components comprising ferrite, but also a reduction in the bulk of the converter 1 by allowing a more compact converter to be obtained.

In the embodiments, the second switch MB2 of the second arm B can be replaced by a diode DB (illustrated in FIG. 14) whose cathode is connected to the third connection point P3. A unidirectional converter is then obtained instead of a bidirectional converter, as is the case when the second arm B comprises a second switch MB2.

FIG. 13 shows an example of a converter according to a fifth embodiment. The converter 1 in FIG. 13 is obtained from the converter in FIG. 2 by adding a third arm E of switches and two primary circuits 101E, 101'E that are similar to the first arm A and to the two primary circuits 101, 101' of the converter in FIG. 2. In particular, the third arm E comprises a first switch ME1 in series with a capacitance CE and a second switch ME2. A first end terminal of the third arm E corresponds to the terminal of the first switch ME1 that is not connected to the capacitance CE; a second end terminal of the third arm E corresponds to the terminal of the second switch ME2 that is not connected to the capacitance CE. The first end terminal of the third arm E is connected to the first end terminal of the first arm A and the second end terminal of the third arm E is connected to the second end terminal of the first arm A. Adding a third arm E and two primary circuits 101E, 101'E to the converter in FIG. 2 allows the voltage range that can be accessed by the isolated DC/DC converter 1 to be doubled. The converter 1 can comprise as many supplementary arms E and primary circuits 101E, 101'E as necessary. This embodiment is compatible with all the other embodiments.

The examples of an isolated DC/DC converter 1 according to the invention are particularly suited to onboard applications in a vehicle, notably an electric or hybrid vehicle, for the conversion of voltage between a first and a second onboard power supply system with different voltages.

In particular, the isolated DC/DC converter 1 may be included in a system comprising an AC/DC converter that is configured to supply power to an electric machine of the vehicle from the first power supply system. A capacitance can be connected to the input terminals of the AC/DC converter in order to form the interface between the first power supply system and the AC/DC converter. The isolated DC/DC converter 1 can then be connected to the terminals of this capacitance so as to perform precharging or discharging operations for the capacitance. By way of example, such a system is described in the European Patent Application publication EP2012338 A1. The converter according to the fourth embodiment illustrated in FIG. 12 is particularly suited to these precharging or discharging operations because it allows the capacitance to be precharged from a zero initial voltage at the terminals of the capacitance, and allows the capacitance to be discharged to a zero final voltage at the terminals of the capacitance.

The invention is not limited to the examples described. In particular, the voltage loops can be replaced by current loops. The isolated DC/DC converter can also be used in an AC/DC converter that is configured to convert an AC voltage into a DC voltage or vice versa, or in an AC/AC converter. Advantageously, the isolated DC/DC converter is then complemented by an AC/DC converter upstream of the first arm A in the first or the fifth embodiment, or upstream of the regulating circuit 2 in the second embodiment, or upstream of the second arm B for the third or the fourth embodiment; and/or a DC/AC converter downstream of the isolated DC/DC converter.

Notably, the switches may be transistors, such as MOSFET, IGBT, or other transistors. The circuits can be produced from a semiconductor material such as silicon (Si), gallium nitride (GaN), silicon carbide (SiC) or any other semiconductor material.

The invention claimed is:

1. An isolated DC/DC converter comprising an isolated circuit having:
   a first arm having a first switch, in series with a second switch;
   a magnetic component having two primary circuits and a secondary circuit that are separated by at least one electrical isolation barrier, said magnetic component being configured so as, during the conversion of an input voltage of the isolated DC/DC converter into an output voltage, to operate as a transformer from the primary circuits to the secondary circuit and as an impedance that stores energy in the primary circuits, and in which:
   the first arm comprises a first capacitance in series with the two switches and situated between the two switches,
   one of said primary circuits, called the second primary circuit, is connected between a first end terminal of the first arm and the connection point, called the second connection point, between the second switch of the first arm and the first capacitance, the first end terminal of the first arm corresponding to the terminal of the first switch that is not connected to the first capacitance; and
   the other primary circuit, called the first primary circuit, is connected between a second end terminal of the first arm and the connection point, called the first connection point, between the first switch and the first capacitance, the second end terminal of the first arm corresponding to the terminal of the second switch that is not connected to the first capacitance.

2. The isolated DC/DC converter according to claim 1, in which the magnetic component is configured so that:
   over a first portion of an operating period of the converter, first respective portions of the primary circuits transfer an energy to a first portion of the secondary circuit, and second respective portions of the primary circuits produce inductances storing energy;
   over a second portion of the operating period of the converter, the second respective portions of the primary circuits transfer an energy to a second portion (L22) of the secondary circuit, and the first respective portions of the primary circuits produce inductances storing energy.

3. The isolated DC/DC converter according to claim 1, in which the input of the isolated circuit (3) is at the first end terminal of the first arm.

4. The isolated DC/DC converter according to claim 1, comprising a regulating circuit connected to the first end terminal of the first arm and configured to regulate a voltage delivered to the first arm, the regulating circuit being configured to control the output voltage of the isolated DC/DC converter by modifying the voltage delivered to the first arm, the duty cycle of the first arm remaining substantially constant.

5. The isolated DC/DC converter according to claim 4, in which a second capacitance is connected between the first end terminal of the first arm and the second end terminal of the first arm.

6. The isolated DC/DC converter according to claim 1, comprising:
    a second arm having a first switch and a second electronic element in series, the free terminal of the second electronic element being connected to the second end terminal of the first arm,
    an inductance connected between the second connection point and a third connection point, the third connection point corresponding to the terminal of the second electronic element that is close to the first switch of the second arm,
    a second capacitance connected between the first end terminal of the first arm and the second end terminal of the first arm,
    the second electronic element being a second switch or a diode having its cathode connected to the third connection point,
    and in which successions of opening and closing operations of the switch(es) of the second arm allow an input voltage to be converted into an output voltage by means of the magnetic component.

7. The isolated DC/DC converter according to claim 6, in which the second arm is configured to control the output voltage of the isolated DC/DC converter by modifying an electrical parameter of a signal flowing through the inductance.

8. The isolated DC/DC converter according to claim 7, in which the electrical parameter is an average current.

9. The isolated DC/DC converter according to claim 7, in which the first arm configured so that its duty cycle has a nominal value and varies around this nominal value according to a difference between a value of the electrical parameter of the signal flowing through the inductance and a value of the electrical parameter of the signal flowing through the magnetic component.

10. The isolated DC/DC converter according to claim 9, in which the first arm is configured so that its duty cycle has a nominal value and varies around this nominal value so that the value of the electrical parameter of the signal flowing through the inductance and the value of the electrical parameter of the signal flowing through the magnetic component are equal.

11. The isolated DC/DC converter according to claim 6, in which the duty cycle of the first arm remains substantially constant at a nominal value.

12. The isolated DC/DC converter according to claim 6, moreover comprising:
    a third capacitance in series between the first switch of the second arm and the second electronic element of the second arm, the third capacitance being connected between the third connection point and a fourth connection point corresponding to the terminal of the first switch that is close to the second electronic element of the second arm,
    another inductance connected between the first connection point and the fourth connection point.

13. The isolated DC/DC converter according to claim 1, in which
    the isolated circuit moreover comprises at least one third arm comprising a first switch, a second switch and a fourth capacitance in series with the two switches and situated between the two switches; and in which the magnetic component comprises at least two supplementary primary circuits separated from one another and from the secondary circuit by at least one electrical isolation barrier,
    one of said supplementary primary circuits, called the first supplementary primary circuit, is connected between a first end terminal of the third arm and the connection point between the second switch of the third arm and the fourth capacitance, the first end terminal of the third arm corresponding to the terminal of the first switch of the third arm that is not connected to the fourth capacitance; and
    the other of said supplementary primary circuits, called the second supplementary primary circuit, is connected between a second end terminal of the third arm and the connection point between the first switch of the third arm and the fourth capacitance, the second end terminal of the third arm corresponding to the terminal of the second switch of the third arm that is not connected to the fourth capacitance,
    the end terminals of the first and third arms being respectively connected to one another.

14. A voltage conversion method using an isolated DC/DC converter according to claim 6, in which control of the output voltage of the isolated DC/DC converter comprises the steps consisting in:
    modifying an electrical parameter of a signal flowing through the inductance by varying the duty cycle of the second arm,
    varying the duty cycle of the first arm around a nominal value according to a difference between a value of the electrical parameter of the signal flowing through the inductance and a value of the electrical parameter of the signal flowing through the magnetic component.

* * * * *